United States Patent
Royyuru et al.

(10) Patent No.: US 10,354,247 B2
(45) Date of Patent: Jul. 16, 2019

(54) SYSTEMS AND METHODS FOR PROCESSING PAYMENT TRANSACTIONS

(71) Applicants: Vijay Kumar Royyuru, Norristown, PA (US); Jean M. Sindaco, Havertown, PA (US); Bradley T. Masterson, Elkhorn, NE (US); Peter Allen Donat, Palo Alto, CA (US)

(72) Inventors: Vijay Kumar Royyuru, Norristown, PA (US); Jean M. Sindaco, Havertown, PA (US); Bradley T. Masterson, Elkhorn, NE (US); Peter Allen Donat, Palo Alto, CA (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 13/801,930

(22) Filed: Mar. 13, 2013

(65) Prior Publication Data

US 2013/0254110 A1  Sep. 26, 2013

Related U.S. Application Data

(60) Provisional application No. 61/613,248, filed on Mar. 20, 2012.

(51) Int. Cl.
| | | |
|---|---|---|
| *G06Q 40/00* | (2012.01) | |
| *G06Q 20/38* | (2012.01) | |
| *G06Q 20/34* | (2012.01) | |
| *G06Q 20/36* | (2012.01) | |

(52) U.S. Cl.
CPC ........... *G06Q 20/38* (2013.01); *G06Q 20/356* (2013.01); *G06Q 20/36* (2013.01)

(58) Field of Classification Search
CPC ...................................................... G06Q 20/38
USPC ............................... 705/40, 44, 51; 709/250
See application file for complete search history.

(56) References Cited

U.S. PATENT DOCUMENTS

| | | | | |
|---|---|---|---|---|
| 5,931,917 A * | 8/1999 | Nguyen | ................. | G06Q 20/12 709/203 |
| 6,304,915 B1 * | 10/2001 | Nguyen | ................. | G06Q 20/00 709/217 |
| 2007/0233603 A1 * | 10/2007 | Schmidgall | ............ | G06Q 20/02 705/51 |
| 2007/0282743 A1 * | 12/2007 | Lovelett | ................. | G06Q 20/10 705/40 |
| 2012/0011067 A1 * | 1/2012 | Katzin et al. | ................... | 705/44 |

(Continued)

*Primary Examiner* — Samica L Norman
(74) *Attorney, Agent, or Firm* — Eversheds Sutherland (US) LLP

(57) ABSTRACT

Embodiments of the disclosure relate to systems and methods for communicating transaction-related data to a recipient device. In at least one embodiment, a computer-implemented method can be provided. The method can include directing storage of transaction-related information comprising payment data and value added services data. The method can further include communicating the transaction-related information to a recipient device during a card emulation communication initiated by the recipient device, wherein the recipient device utilizes the transaction-related information to complete a payment transaction and provide one or more value added services associated with the payment transaction.

16 Claims, 3 Drawing Sheets

(56) References Cited

U.S. PATENT DOCUMENTS

2012/0215688 A1* 8/2012 Musser ............... G06Q 20/102
705/40
2013/0339250 A1* 12/2013 Katzin ............... G06Q 20/027
705/44

* cited by examiner

SYSTEMS AND METHODS FOR PROCESSING PAYMENT TRANSACTIONS

RELATED APPLICATION

This application claims priority to U.S. Provisional Patent Application No. 61/613,248, entitled "Systems and Methods for Processing Payment Transactions," filed on Mar. 20, 2012, the contents of which are incorporated by reference herein in their entirety.

TECHNICAL FIELD

Embodiments of the disclosure relate generally to payment transactions, and more specifically to the processing of payment transactions having different message types and/or formats.

BACKGROUND

Various payment processors and payment networks utilize a wide variety of different message conventions and formats in association with payment transactions. For example, personal identification number ("PIN") debit networks, such as STAR and the New York Currency Exchange ("NYCE") network, use Single Message protocols in which a payment transaction is conveyed, authorized, and settled in a single real-time request/reply message from a merchant or acquirer to an account issuer or authorizer. Signature debit networks, such as Visa and MasterCard, use Dual Message protocols in which an authorization message is processed in a real-time request/reply manner that results in the authorization of a transaction that is returned to a merchant or acquirer. A second completion message is then processed in a batch or store-and-forward non-real time manner to facilitate completion of the transaction and funds settlement.

However, various parties to payment transactions, such as merchants, acquirers, authorizers, and issuers, are not always equipped to handle different types of messages. For example, a party may not be capable of handling both Single Message and Dual Message transactions. Additionally, a wide variety of message formats may be utilized in association with payment transaction messages. More particularly, each payment network typically defines its own payment message format and/or proprietary message structure. The multitude of payment types or conventions and message formats may make it difficult for a party to participate in certain types of transactions. Additionally, the effort and cost for interfacing parties into a payment scheme or introducing parties to a new payment scheme may be increased. Accordingly, there is an opportunity for improved systems and methods for processing payment transactions having different message types and/or formats.

BRIEF DESCRIPTION OF THE DISCLOSURE

Certain embodiments of the disclosure can address some or all of the above needs. Certain embodiments of the disclosure can provide systems and methods for processing payment transactions. In certain instances, systems and methods can facilitate processing of payment transactions having different message types and/or formats. In one embodiment, one or more computer-readable media can be provided. The one or more computer-readable media can be configured to store computer-executable instructions. When executed by one or more processors, the computer-executable instructions can configure the one or more processors to receive a payment transaction message. In addition, the computer-executable instructions can configure the one or more processors to convert the payment transaction message into an internal format. Furthermore, the computer-executable instructions can configure the one or more processors to process the converted internal format message. Moreover, the computer-executable instructions can configure the one or more processors to convert the payment transaction message into a format expected by a recipient of the transaction message. Further, the computer-executable instructions can configure the one or more processors to output the payment transaction message for communication to the recipient.

In one aspect of an embodiment, the computer-executable instructions operable to receive a payment transaction message can include computer-executable instructions operable to receive one of (i) a payment authorization message, (ii) a payment settlement message, or (iii) a combined payment authorization/settlement message.

In one aspect of an embodiment, the computer-executable instructions operable to receive a payment transaction message can include computer-executable instructions operable to receive a payment transaction message from one of a merchant or an issuer.

In one aspect of an embodiment, the received payment transaction message can include one of (i) a single message protocol message or (ii) a dual message protocol message, and wherein the output payment transaction messages can include the other of the (i) a single message protocol message or (ii) a dual message protocol message.

In another embodiment, a computer-implemented method can be provided. The method can include receiving, by a service provider system comprising one or more computers, a payment transaction message. In addition, the method can include converting, by the service provider system, the payment transaction message into an internal format. Furthermore, the method can include processing, by the service provider system, the converted internal format message. Moreover, the method can include converting, by the service provider system, the payment transaction message into a format expected by a recipient of the transaction message. Further, the method can include outputting, by the service provider system, the payment transaction message for communication to the recipient.

In one aspect of an embodiment, receiving a payment transaction message can include receiving one of (i) a payment authorization message, (ii) a payment settlement message, or (iii) a combined payment authorization/settlement message.

In one aspect of an embodiment, receiving a payment transaction message can include receiving a payment transaction message from one of a merchant or an issuer.

In one aspect of an embodiment, the received payment transaction message can include one of (i) a single message protocol message or (ii) a dual message protocol message, and wherein the output payment transaction messages can include the other of the (i) a single message protocol message or (ii) a dual message protocol message.

In another embodiment, a system can be provided. The system can include at least one processor operable to execute one or more computer-executable instructions. The system can also include at least one memory comprising computer-executable instructions. The computer-executable instructions can be operable to receive a payment transaction message; convert the payment transaction message into an internal format; process the converted internal format message; convert the payment transaction message into a format expected by a recipient of the transaction message; and output the payment transaction message for communication to the recipient.

In one aspect of an embodiment, the computer-executable instructions operable to receive a payment transaction message can further include computer-executable instructions operable to receive one of (i) a payment authorization message, (ii) a payment settlement message, or (iii) a combined payment authorization/settlement message.

In one aspect of an embodiment, the computer-executable instructions operable to receive a payment transaction message can further include computer-executable instructions operable to receive a payment transaction message from one of a merchant or an issuer.

In one aspect of an embodiment, the received payment transaction message can include one of (i) a single message protocol message or (ii) a dual message protocol message, and wherein the output payment transaction messages can include the other of the (i) a single message protocol message or (ii) a dual message protocol message.

In another embodiment, a computer-implemented method can be provided. The method can include receiving, by a service provider system comprising one or more computers, a plurality of payment transaction messages, each message formatted in accordance with a different protocol. The method can also include translating, by the service provider system, each of the plurality of payment transaction messages into an internal format. In addition, the method can include performing, by the service provider system, internal processing on each of the translated internal format messages.

In one aspect of an embodiment, the method can also include identifying, by the service provider system, a recipient for one of the plurality of internal format messages; and translating, by the service provider system, the internal format message into a format expected by the recipient.

In yet another embodiment, a system can be provided. The system can include at least one processor operable to execute one or more computer-executable instructions. The system can also include at least one memory comprising computer-executable instructions. The computer-executable instructions can be operable to receive a plurality of payment transaction messages, each message formatted in accordance with a different protocol; translate each of the plurality of payment transaction messages into an internal format; and perform internal processing on each of the translated internal format messages.

In one aspect of an embodiment, the at least one memory can include computer-executable instructions further operable to identify a recipient for one of the plurality of internal format messages; and translate the internal format message into a format expected by the recipient.

In yet another embodiment, one or more computer-readable media can be provided. The one or more computer-readable media can be configured to store computer-executable instructions. When executed by one or more processors, the computer-executable instructions can configure the one or more processors to receive a plurality of payment transaction messages, each message formatted in accordance with a different protocol; translate each of the plurality of payment transaction messages into an internal format; and perform internal processing on each of the translated internal format messages.

In one aspect of an embodiment, the computer-executable instructions can configure the one or more processors to identify a recipient for one of the plurality of internal format messages; and translate the internal format message into a format expected by the recipient.

Additional systems, methods, apparatus, features, and aspects are realized through the techniques of various embodiments of the disclosure. Other embodiments and aspects of the disclosure are described in detail herein and are considered a part of the claimed disclosure. Other features and aspects can be understood with reference to the description and to the drawings.

DETAILED DESCRIPTION

Figure 1:
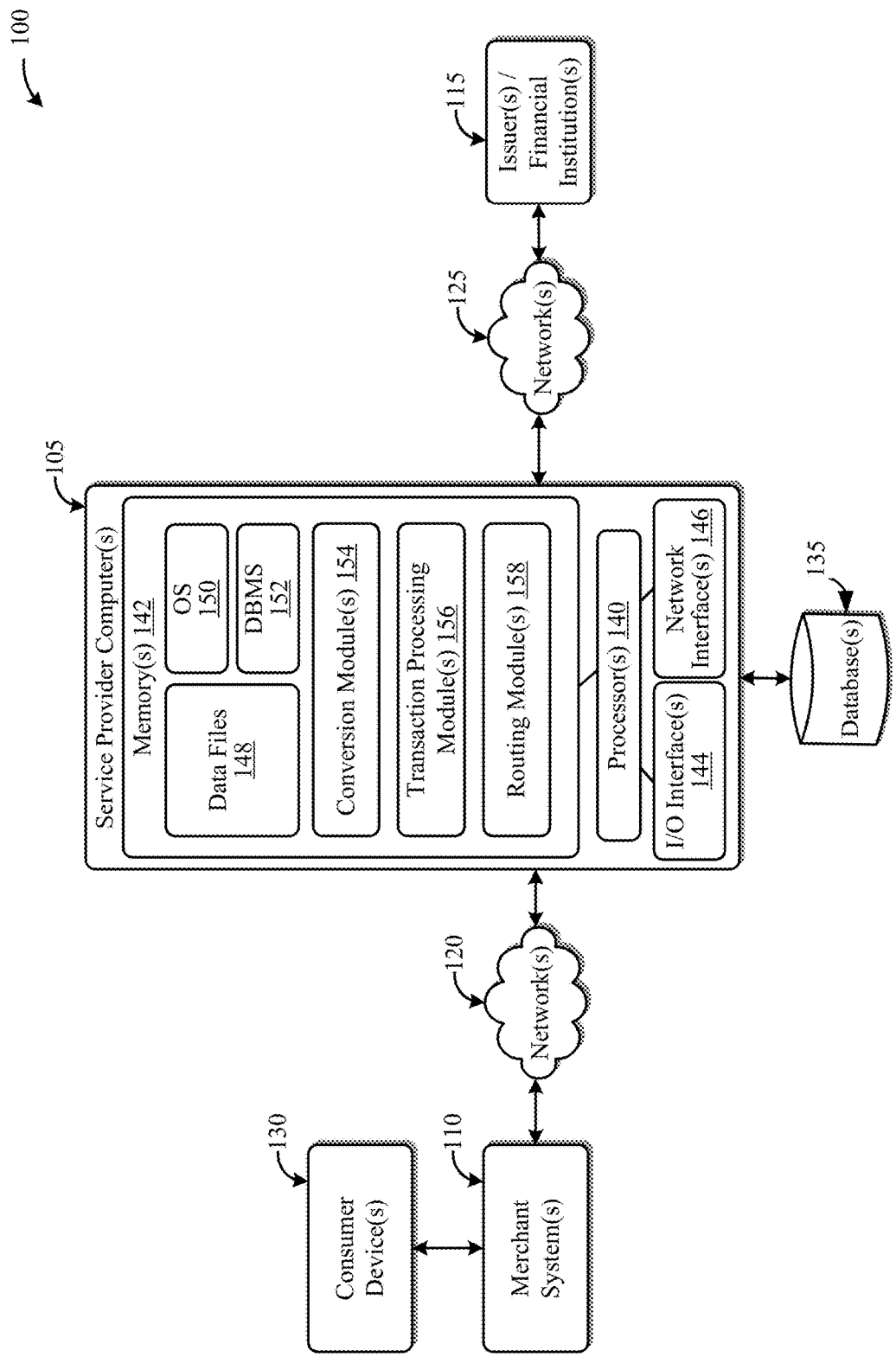
FIG. 1 illustrates a block diagram of an example system that may be utilized in accordance with various embodiments of the disclosure to facilitate the processing of payment transactions.

Various embodiments of the disclosure are directed to systems and methods for processing payment transactions having different message types and/or formats. In certain embodiments, payment transaction messages may be received from a wide variety of different systems and/or devices, such as merchant point of sale ("POS") devices and/or merchant acquirer platforms. A received payment transaction message may be one of a wide variety of different types (e.g., a Single Message transaction, a Dual Message transaction, a batch file of transactions, etc.). Additionally, a received payment transaction message may be formatted in accordance with a wide variety of different formats, such as variations of the International Standards Organization ("ISO") 8583 message structure.

Once a payment transaction message has been received, the message may be converted into an internal format for processing by a service provider system. For example, one or more translators may be utilized to convert a message into an internal format. Once converted into the internal format, a wide variety of processing may be performed on the message. For example, various routing switching, settlement, value added services ("VAS"), fraud prevention, chargeback, exception handling, and/or other functions can be performed. As a result of converting the message into an internal format, the internal processing may be applicable to a wide variety of different types of payment transactions and/or message formats. Additionally, as desired in various embodiments, a wide variety of merchant, acquirer, issuer, and/or authorizer parameters and/or preferences may be evaluated in order to determine the types of internal processing that is performed with respect to the payment transaction message.

Additionally, a recipient, such as a payment account issuer or transaction authorizer, may be identified for a payment transaction. For example, a Banking Identification Number ("BIN") or other recipient designation included in a payment message may be evaluated in order to identify the recipient. Once identified, preferences and/or parameters associated with the recipient, such as parameters associated with desired message types and/or formats may be accessed and evaluated. In this regard, the message may be converted from the internal format to a type and format that is expected by the recipient. Once converted into an expected outgoing format, the message may be routed or otherwise communicated to the recipient.

Embodiments of the disclosure now will be described more fully hereinafter with reference to the accompanying drawings, in which certain embodiments are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

System Overview

FIG. 1 illustrates a block diagram of an example system 100 that may be utilized in accordance with various embodiments of the disclosure to facilitate the processing of payment transactions. In certain embodiments, the system 100 may include a suitable service provider system that processes and routes payment transactions and/or payment transaction messages. Additionally, the service provider system may perform a wide variety of suitable processing on the payment transactions. As shown in FIG. 1, the system 100 may include one or more service provider computers 105 that are associated with the service provider, one or more merchant systems 110 (or other transaction origination and/or delivery systems, such as acquirer systems), and/or one or more issuer (e.g., payment account issuer, etc.) and/or financial institution systems 115. As shown any number of suitable networks 120, 125 may facilitate communications between the merchant systems 110, service provider computers 105, and the issuer systems 115. Although two separate groups of one or more networks 120, 125 are illustrated, a single network or group of networks can be utilized. For example, a transaction network may facilitate both communication of a payment transaction to the service provider computers 105 and routing of the payment transaction to an issuer system 115. As desired, the system 100 may additionally include a wide variety of other entities associated with payment transactions, such as one or more service providers that implement VAS, etc. These service providers may be the same or different than the service provider associated with the service provider computers 105.

In one example implementation, a merchant system 110 may generate a payment transaction message (e.g., a payment transaction request, etc.) that is output for communication to the service provider computers 105 and/or for delivery to a suitable issuer system 115 (or other recipient). In certain embodiments, the merchant system 110 may interact with a suitable customer or consumer device 130 (e.g., a payment card, a mobile device, a contactless payment device, a personal computer or mobile device in an eCommerce transaction) in order to obtain transaction-related information, such as payment account information, transaction tokens, and/or preferences associated with VAS. The merchant system 110 may utilize at least a portion of the obtained information, as well as other transaction-related information (e.g., a payment amount, merchant preferences, identification information for an issuer, etc.) in order to generate a payment transaction message. The generated payment transaction message may then be output for communication to the service provider computers 105 and/or for delivery to the issuer system 115. During communication of the transaction message, the service provider computers 105 may receive (e.g., receive from the merchant system 110, receive from an acquirer system, etc.) and process the transaction message utilizing the functionality described herein. The service provider computers 105 may also route or otherwise communicate the transaction message or a modified or converted form of the transaction message to the issuer system 115. In certain embodiments, the service provider computers 105 may also return one or more responses to the transaction message to the merchant system 110 (e.g., a response received from the issuer system 115, a modified or converted issuer system response, a response generated by the service provider computers 105, etc.).

With reference to FIG. 1, any number of service provider computers 105 may be provided. A service provider computer 105 may be any suitable processor-driven device that facilitates the receipt, processing, and/or routing of payment transactions or payment transaction messages. Examples of suitable processor-driven devices that may be utilized as a service provider computer 105 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the service provider computer 105 may form a special purpose computer or other particular machine that is operable to facilitate the processing of payment transactions or payment transaction messages as described herein. Additionally, in certain embodiments, the service provider computer 105 may be in communication with any number of internal and/or external databases 135 configured to store information utilized during the processing of payment transactions and/or information associated with processed payment transactions.

In addition to having one or more processors 140, the service provider computer 105 may further include and/or be associated with one or more memory devices 142 (generally referred to as memory 142), input/output ("I/O") interface(s) 144, and/or network interface(s) 146. The memory 142 may be any computer-readable medium, coupled to the processor(s) 140, such as random access memory ("RAM"), read-only memory ("ROM"), and/or a removable storage device. The memory 142 may store a wide variety of data files 148, at least a portion of the databases 135, and/or various program modules, such as an operating system ("OS") 150, a database management system ("DBMS") 152, one or more conversion modules 154, one or more transaction processing modules 156, and/or one or more routing modules 158. The data files 148 may include any suitable data that facilitates the operation of the service provider computer 105 and/or interaction of the service provider computer 105 with one or more other components (e.g., one or more merchant systems 110, one or more acquirers, one or more issuer systems 115, etc.) of the system 100. For example, the data files 148 may include information that facilitates the processing of received payment transactions, information associated with converting received payment transactions, information associated with merchants and/or acquiring platforms, information associated with issuer systems 115, information associated with internal processing to be performed on payment transaction, information associated with VAS, and/or routing information for proposed transactions.

The databases 135 may include any number of databases configured to store information associated with the processing of payment transactions or transaction messages. Examples of data that may be stored in the databases 135 include, but are not limited to, conversion rules for converting payment transaction messages to an internal format, conversion rules for converting internal format payment transaction messages to an outgoing format, merchant preferences associated with the processing and/or routing of payment transactions, issuer preferences associated with the processing and/or routing of payment transactions, etc.

The OS 150 may be a suitable module that facilitates the general operation of the service provider computer 105, as well as the execution of other program modules. For example, the OS 150 may be, but is not limited to, Microsoft Windows®, Apple OSX™, Unix, a mainframe computer operating system (e.g., IBM z/OS, MVS, OS/390, etc.), or a specially designed operating system. The DBMS may facilitate the management of information stored in the one or more databases 135.

The conversion modules 154 may include any number of suitable software modules and/or applications that facilitate the conversion of transaction messages from a first format into a second format. For example, the conversion modules 154 may convert incoming transactions into an internal format. As another example, the conversion modules 154 may convert incoming transactions and/or internal format transactions into a format expected by a recipient device. In this regard, the conversion modules 154 may perform a wide variety of different message translation services. Additionally, a wide variety of different conversion modules may be provided as desired in various embodiments. For example, certain conversion modules may receive inbound real-time messages in a first format (e.g., a Single Message format, a Dual Message format) and dynamically convert the inbound messages into an internal format, thereby providing functionality for processing a wide variety of different types of inbound messages. Other conversion modules may convert abstracted internal format messages into outbound real-time messages having another format, thereby providing functionality for communicating messages to issuers and/or other recipients in a wide variety of different formats. Yet other conversion modules may convert batch transactions (e.g., transactions received in a batch file, etc.) into real-time messages for internal processing and/or for delivery to recipient devices. Yet other conversion modules may suppress outbound messages and convert the outbound messages into a batch format. Indeed, a wide variety of different conversions can be performed as desired.

The transaction processing modules 156 or applications may include any number of suitable software modules and/or applications that facilitate the internal processing of transaction messages. In certain embodiments, the transaction processing modules 156 may receive transaction messages formatted in accordance with an internal format. The transaction processing modules 156 may then perform a wide variety of suitable services associated with the transaction messages. For example, the transaction processing modules 156 may facilitate settlement of transactions that have been approved. As another example, the transaction processing modules 156 may evaluate transactions in order to identify any errors included in the transactions. The transaction processing modules 156 may also facilitate chargebacks, exceptions, and/or miscellaneous funding associated with transactions. The transaction processing modules 156 may also facilitate a wide variety of reporting, billing, analytical, and/or fraud detection functions. Additionally, because the transaction processing modules 156 are configured to operate on transactions that have been converted to an internal format, services may be performed for a wide variety of different types of transactions.

The routing modules 158 may include any number of suitable software modules and/or applications that facilitate the routing of transactions or transaction messages to recipient devices, such as the issuer systems 115. In certain embodiments, the routing modules 158 may evaluate information included in a payment transaction (e.g., a BIN, etc.) to identify a recipient of the payment transaction. The routing modules 158 may then direct communication of the payment transaction or a modified version of the payment transaction to the recipient.

In certain embodiments, the conversion modules 154, transaction processing modules 156, and/or routing modules 158 may be configured to utilize received and/or stored preferences and/or parameters in order to process transactions. For example, merchant preferences and/or issuer preferences may be evaluated in order to facilitate the conversion of inbound messages, the processing of internal format messages, the conversion of outbound messages, the selection of a recipient for an outbound message, and/or the routing or other delivery of outbound messages.

With continued reference to the service provider computer 105, any number of suitable I/O interfaces 144 may facilitate communication between the service provider computer 105 and one or more input/output devices; for example, one or more user interface devices, such as a display, a keypad, a mouse, a pointing device, a control panel, a touch screen display, a remote control, a microphone, a speaker, etc., that facilitate user interaction with the service provider computer 105. The one or more network and/or communication interfaces 146 may facilitate connection of the service provider computer 105 to one or more suitable networks and/or communication links. In this regard, the service provider computer 105 may receive and/or communicate information to other components of the system 100.

With continued reference to FIG. 1, any number of consumer devices 130 may be configured to provide transaction-related information (e.g., payment account information, transaction tokens, etc.) to a merchant system 110 or other system that generates a transaction message. Examples of suitable consumer devices 130 include, but are not limited to, mobile devices (e.g., mobile phones, smart phones, etc.), other contactless transaction devices, personal computers, magnetic stripe cards, etc. As desired, a consumer device 130 may include similar components as those described above for the service provider computer 105. For example, a consumer device 130 may include any number of processors, memory devices, I/O interfaces, and/or network interfaces. Additionally, in certain embodiments, a consumer device 130 may be configured to initiate a payment transaction and output a transaction message that is received by the service provider computers 105.

With continued reference to FIG. 1, any number of merchant devices 110, such as merchant POS devices may be provided. A merchant device 110 may be a suitable device that facilitates the generation of a payment transaction or transaction message that is output for delivery to an issuer system 115. In operation, the merchant device 110 may collect information associated with a payment transaction (e.g., information read from and/or received from a consumer device, a transaction amount, etc.), and the merchant device 110 may generate a transaction message or transaction request. The generated transaction message may then be output for communication to an acquirer platform, the service provider computers 105, and/or an issuer system 115. In either case, the transaction message may be received and processed by the service provider computers 105. Additionally, the merchant device 110 may be configured to receive any number of messages output by the service provider computers 105, such as transaction approval messages and/or declined transaction messages received from an issuer system 115 and processed by the service provider computers 105 and/or various messages generated by the service provider computers 105. As desired, a merchant device 110 may include similar components as those described above for the service provider computer 105. For example, a merchant device 110 may include any number of processors, memory devices, I/O interfaces, and/or network/communication interfaces.

Additionally, any number of issuer and/or financial institution systems 115 may be provided. An issuer system 115 may facilitate the backend processing of a payment transaction. For example, an issuer system 115 may facilitate the approval and/or settlement of a payment transaction. In certain embodiments, a transaction message may be routed or otherwise communicated to an issuer system 115 from the service provider computers 105 via a suitable transaction network (e.g., a debit network, a credit network, etc.), and the issuer system 115 may evaluate the payment transaction. An approval or rejection of the payment transaction and/or financial settlement data may then be output for communication to a merchant system 110 and/or processing by the service provider computers 105. In certain embodiments, an issuer system 115 may include similar components as those discussed above for the service provider computer 105. For example, an issuer system 115 may include any number of processors, memories, I/O interfaces, and/or network/communication interfaces.

Although not illustrated in FIG. 1, any number of additional service provider computers may be utilized as desired in various embodiments. These service provider computers may provide a wide variety of transaction-related and/or value added services ("VAS") in association with transactions, such as coupon redemption services, loyalty services, location-based services, electronic receipt services, product registration services, warranty services, coupon issuance services, etc. In certain embodiments, these computers may include similar components as those discussed above for the service provider computers 105. For example, these computers may include any number of processors, memories, I/O interfaces, and/or network/communication interfaces. Additionally, in certain embodiments, these service provider computers may be combined with the other service provider computers 105.

A wide variety of suitable networks and/or communication channels 120, 125 may be utilized in association with embodiments of the disclosure. For example, one or more transaction networks (e.g., interbank networks, debit and/or PIN network, branded networks (e.g., a VISA network, etc.), telecommunication networks, cellular networks, wide area networks (e.g., the Internet), etc. may facilitate communication between various components of the system 100. Other networks and connections, such as NFC connections, may facilitate communication between the consumer devices 130 and the merchant system(s) 110. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Operational Overview

Figure 2:
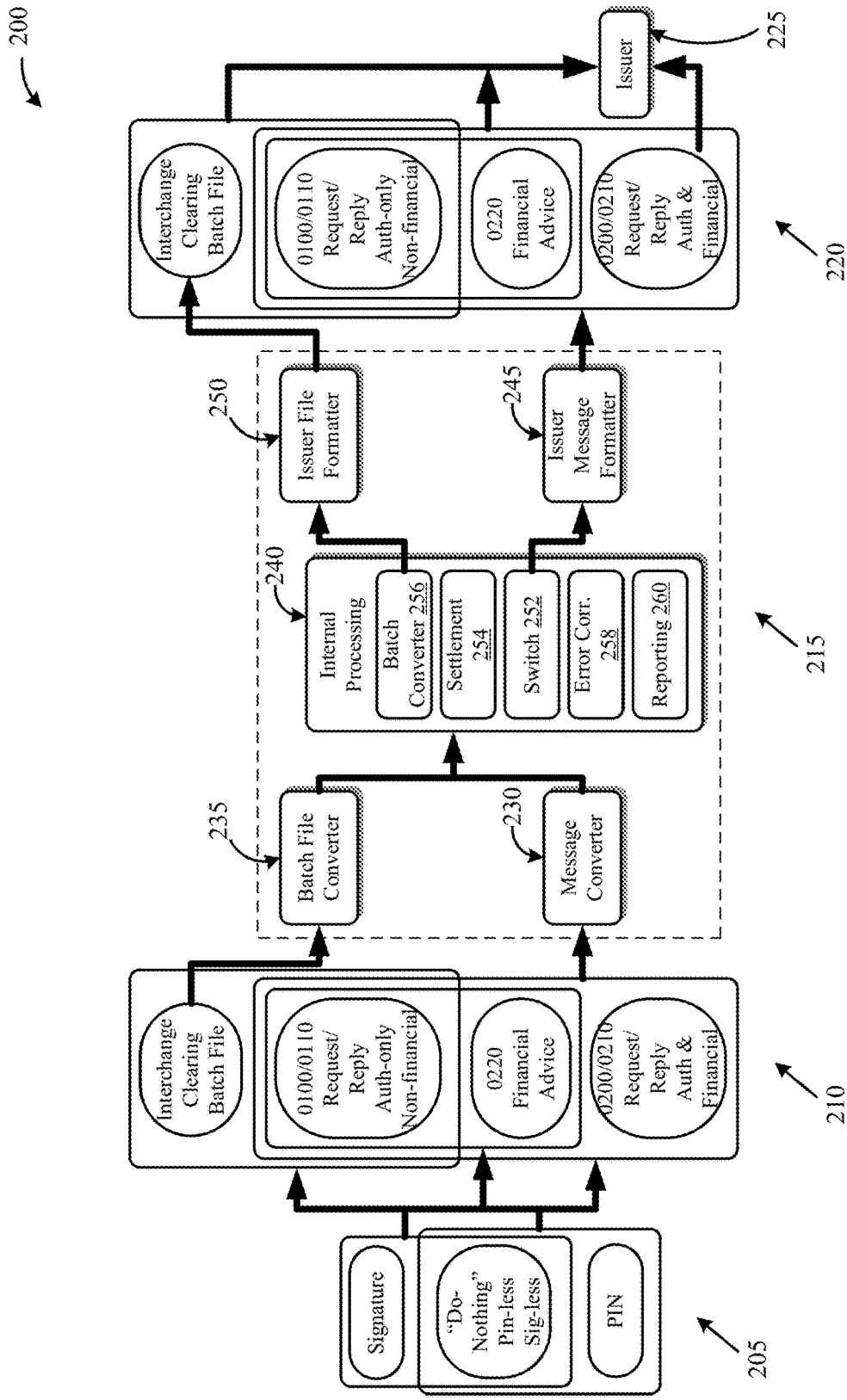
FIG. 2 illustrates a block diagram of an example data flow that may be utilized to process payment transactions, according to an illustrative embodiment of the disclosure.

FIG. 2 illustrates a block diagram of an example data flow 200 that may be utilized to process payment transactions, according to an illustrative embodiment of the disclosure. With reference to FIG. 2, several phases of a transaction are illustrated, including a transaction generation phase 205, an acquiring format phase 210, a service provider processing phase 215, and an issuer format phase 220. In certain embodiments, the transaction generation phase 205 and the acquiring format phase 210 may form an acquiring process. At a high level, a transaction is generated by a merchant or other generation entity at the transaction generation phase 205, and one or more transaction messages are prepared in the acquiring format phase 210. The transaction messages are then delivered to a service provider system, such as the system including one or more of the service provider computers 105 illustrated in FIG. 1, and the service provider system may perform a wide variety of conversion and/or internal processing at the service provider processing phase 215. The service provider system may then generate one or more outbound transaction messages at the issuer format phase 220, and the outbound transaction messages may be communicated to one or more issuer systems, such as the issuer systems 115 illustrated in FIG. 1.

Turning to FIG. 2 in more detail, at the transaction generation phase 205, information associated with a transaction may be collected, such as payment account information, a transaction amount, and/or various authentication data (e.g., a PIN, a signature, etc.). In certain embodiments, information associated with a signature-based transaction may be collected. In other embodiments, information associated with a PIN-based transaction may be collected. In yet other embodiments, information associated with a "Do Nothing" or PIN-less and signature-less transaction may be collected.

Once transaction information has been collected, the transaction information may be utilized to prepare a transaction message at the acquiring format stage 210. As desired, a wide variety of different types of transaction messages may be generated. In one example embodiment, a Single Message protocol may be utilized to generate a single transaction message (e.g., an ISO 8453 0200 message) that facilitates both authorization of a transaction and settlement of the transaction. In response to the single transaction message, a single reply (e.g., an ISO 8453 0210 message) may be expected. In another example embodiment, a Dual Message protocol may be utilized in which a transaction message that requests authorization (e.g., an ISO 8452 0100 message) may be generated. In response to the authorization request, a suitable authorization reply (e.g., an ISO 8453 0110 message) may be expected. Additionally, with a Dual Message protocol, one or more suitable messages may be subsequently generated to facilitate settlement of the transaction, such as a settlement message (e.g., an ISO 8453 0220 message, an online settlement message, a store and forward message, etc.) or a message including a batch clearing or batch settlement file. Additionally, regardless of the type of message, a wide variety of suitable formats, such as variation of an ISO 8583 message format or another suitable format, may be utilized in association with a generated message.

Once generated, a transaction message may be output for communication to the service provider system and/or to an issuer 225. In certain embodiments, a transaction message may be directly communicated to the service provider system. In other embodiments, a transaction message may be delivered to the service provider system via another system, such as an acquirer platform. Once a transaction or transaction message is received by a service provider system, a wide variety of processing may be performed at the service provider processing phase 215. In certain embodiments, an inbound or incoming message may be converted by the service provider system into an internal format (or directly into a format expected by a recipient device). Additionally, a wide variety of internal processing may be performed on an inbound message.

A wide variety of suitable conversions may be performed as desired in various embodiments. For example, a suitable message converter 230 or translator may receive inbound real-time messages in one format (e.g., 0100, 0200, 0220 messages, etc.) and convert the messages into an internal format. The internal format may be a relatively abstract message format that provides independence across a wide variety of message formats. Additionally, the message converter 230 may be configured to receive and convert both Single Message protocol and Dual Message protocol messages. As another example, a batch file converter 235 may receive a batch clearing file and evaluate the batch clearing file to generate one or more internal messages. For example, a batch clearing file may be parsed into individual settlement transactions, and each settlement transaction may be converted into the internal format.

Once messages have been converted into the internal format, a wide variety of suitable internal processing 240 may be performed on the internal messages. In certain embodiments, the internal processing may include a general purpose set of message handling processes that facilitate a wide variety of different services, such as routing, switching, settlement, batch conversion, reporting, VAS, fraud prevention, fraud detection, chargeback/exception, and/or other services. For example, as shown in FIG. 2, a switch 252 may facilitate switching services in which a message is routed to an appropriate recipient (e.g., the issuer 225). In certain embodiments, the recipient may be identified based upon information included in the transaction message, such as a BIN number, a portion of an account number, or another identifier included in the transaction message. A settlement processing component 254 may facilitate the settlement of transactions and the direction of money movement between accounts. A batch converter 256 may facilitate the generation of a batch settlement file from one or more internal messages. An error correction component 258 may facilitate a wide variety of chargeback, exception, funding, and/or other error correction functions. Finally, a reporting component 260 may facilitate a wide variety of reporting billing, analytical, and/or fraud detection functions associated with transactions.

In certain embodiments, preferences and/or parameters associated with issuers and/or merchants may be accessed and evaluated in order to determine the internal processing services 240 that will be performed on various transactions. Additionally, in certain embodiments, accessed preferences and/or parameters (e.g., merchant preferences, etc.) may be utilized to determine a recipient device (e.g., an issuer system) and/or transaction network associated with a recipient device to which a transaction message will be routed. In other embodiments, information included in a transaction message (e.g., a BIN, etc.) may be utilized to identify or determine a recipient device.

Once an issuer 225 or other recipient has been identified for a transaction message (or a plurality of messages) formatted in the internal format, the transaction message may be translated or converted from the internal format into a format expected by the recipient. For example, a suitable issuer message converter 245 or translator may receive internal format messages and convert the messages into outbound messages (e.g., 0100, 0200, 0220 messages) in another format (e.g., a format expected by the recipient). The issuer message converter 245 may be configured to convert internal messages to Single Message protocol or Dual Message protocol messages. As another example, an issuer file formatter 250 may aggregate and/or combine internal messages into a batch clearing file that can be communicated to an issuer 225. For example, in the event that an issuer desired batch clearing, 220 messages and/or 0200 may be utilized to generate a batch clearing file. Indeed, a wide variety of different types of outbound messages may be generated.

At the issuer format phase 220, generated outbound messages may be output for communication to the issuer 225 or another recipient device. A wide variety of different types of messages, including Single Message protocol (e.g., 0200 messages, etc.) and Dual Message protocol (e.g., 0100, 0220 messages, etc.) real-time messages may be output. In the event that a recipient desires a batch clearing file, a batch file may be generated from internal messages and communicated. Additionally, outbound real-time settlement messages may also be suppressed in the event that a batch file is generated. For example, 0220 messages may be suppressed. As another example, Single Message requests (e.g., 0200 messages) may be converted into Dual Message requests with the settlement or financial message being added to a batch file.

According to an aspect of the disclosure, the format of an outbound message may be determined independently of the format of an inbound message. In this regard, a wide variety of different types of transactions may be completed on behalf of merchants and issuers via any number of transaction networks. As a result, greater transaction flexibility may be provided regardless of the capabilities of merchant and/or issuer systems. Additionally, new types of payment mechanisms, such as PayPal payments made at a point of sale, may be facilitated.

Although the conversion and processing of messages in FIG. 2 is described with respect to messages (e.g., authorization messages, settlement messages, etc.) communicated from a merchant to an issuer, similar processing may be performed for messages (e.g., authorization responses, settlement responses, etc.) communicated from the issuer to the merchant. For example, 0110 and 0210 messages may be received and processed. A wide variety of other variations of the data flow 200 illustrated in FIG. 2 can also be performed in accordance with various embodiments of the disclosure.

Figure 3:
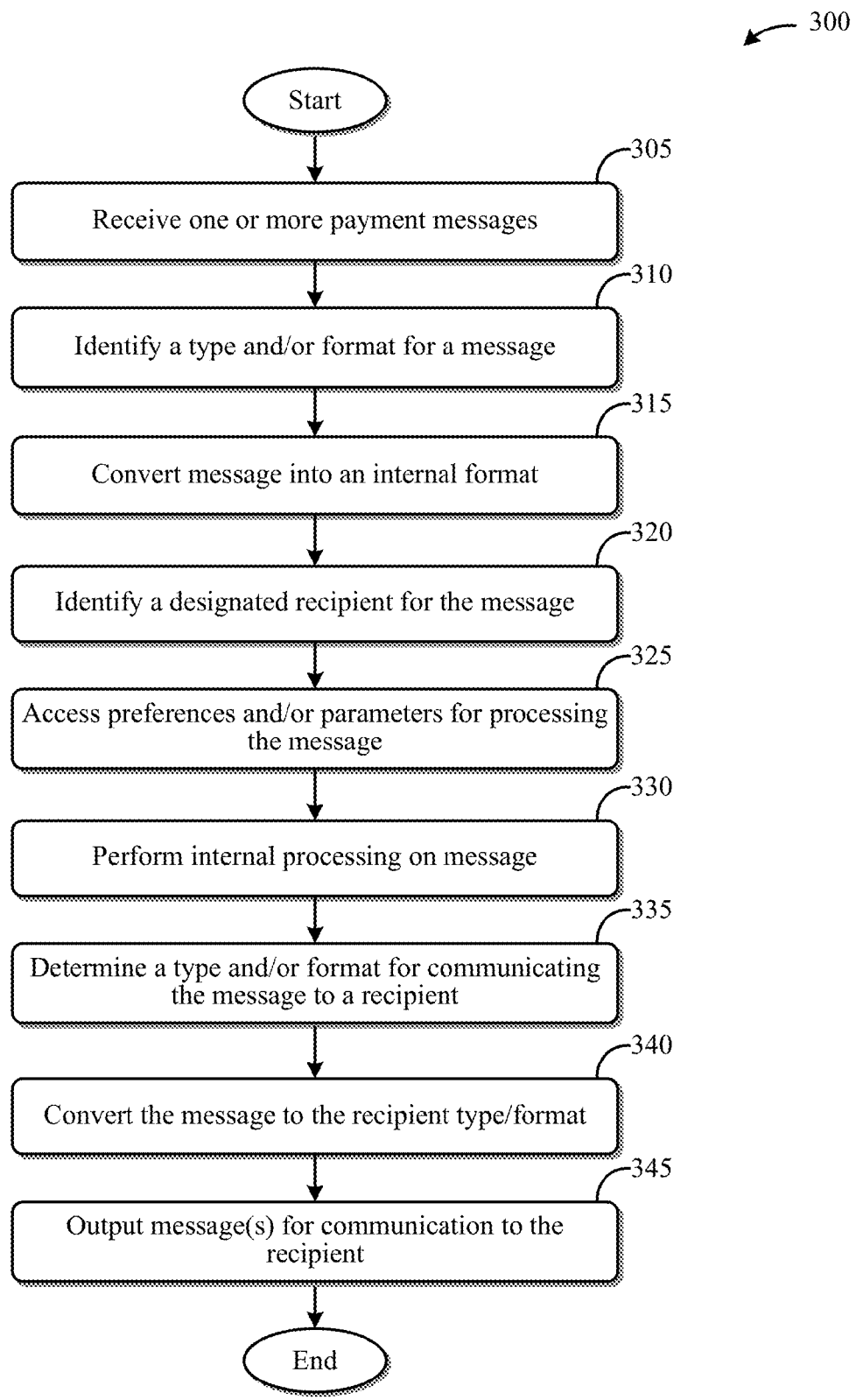
FIG. 3 illustrates a flow diagram of an example process for processing a payment transaction, according to an illustrative embodiment of the disclosure.

FIG. 3 illustrates a flow diagram of an example process 300 for processing a payment transaction, according to an illustrative embodiment of the disclosure. In certain embodiments, the operations of the process 300 may be performed by one or more suitable service provider computers, such as the service provider computers 105 illustrated in FIG. 1. The method 300 may begin at block 305.

At block 305, one or more payment and/or transaction-related messages may be received. For example, real-time transaction messages and/or batch files may be received from merchants and/or acquirer platforms. As another example, real-time transaction messages and/or batch file responses may be received from an issuer, financial institution, or authorization system. Each received message may be converted and/or processed in accordance with the functionality described herein. For example, at block 310, a type and/or format for a message may be identified. In certain embodiments, information included in the message may be evaluated in order to determine a type and/or format of the message. In other embodiments, an identifier and/or information associated with a merchant, issuer, or other originator of the message may be evaluated in order to determine a type and/or format of the message.

At block 315, the message may be converted into an internal format, such as a relatively abstract message format that facilitates internal processing by the service provider computers 105. Additionally, at block 320, a designated recipient (e.g., an issuer, a merchant, etc.) for the message may be identified. For example, information included in the message (e.g., a BIN, etc.) may be evaluated in order to determine a designated recipient. As another example, merchant (or other originator) preferences and/or parameters may be evaluated in order to determine a recipient.

At block 325, a wide variety of preference and/or parameters associated with processing the message may be accessed and/or otherwise obtained. For example, merchant and/or issuer preferences associated with the processing of the message may be accessed. The parameters may be evaluated for a wide variety of different purposes, such as identifying internal processing to be performed and/or for determining a desired format for outputting messages to the recipient. At block 330, a wide variety of different internal processing may be performed with respect to the message. According to an aspect of the disclosure, the internal processing may facilitate processing of internal format messages that originated in a wide variety of different forms.

At block 335, a type (e.g., Single Message protocol, Dual Message protocol, a batch file, etc.) and/or desired format for communicating the message to the designated recipient may be determined, for example, based upon an identity and/or preferences of the recipient. The internal format message may then be converted or translated into the desired outbound format at block 340, and the message may be output for communication to the recipient at block 345.

The operations described and shown in the process 300 of FIG. 3 may be carried out or performed in any suitable order as desired in various embodiments of the disclosure. Additionally, in certain embodiments, at least a portion of the operations may be carried out in parallel. Furthermore, in certain embodiments, less than or more than the operations described in FIG. 3 may be performed.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatuses, and/or computer program products according to example embodiments of the disclosure are described above.

It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:
1. A computer-implemented method comprising:
receiving, by a service provider system comprising one or more computers, a payment transaction message, wherein the payment transaction message is a single protocol message parsed from a batch clearing file;
storing, in at least one database of the service provider system, the payment transaction message as a combined authorization and settlement message, wherein a recipient of the combined authorization and settlement message is identified based upon information included in the combined authorization and settlement message;

converting, by the service provider system, the payment transaction message to a converted internal format message, based on the settlement message being added to the batch clearing file, and wherein the converted internal format message is a dual protocol message corresponding to the payment transaction message;

processing, by the service provider system, the converted internal format message, wherein the processed converted internal format message is received and handled by one or more application services, wherein the one or more application services is based at least in part on a combination of (i) identifying errors in the combined authorization and settlement message, (ii) facilitating settlement and approval of the combined authorization and settlement message, (iii) facilitating chargebacks and exceptions associated with the combined authorization and settlement message, (iv) facilitating reporting, billing, analytical, and fraud detection functions;

determining, by a message converter in the service provider system, a recipient format of the converted internal format message based at least in part on at least one of preferences or parameters associated with a recipient of a recipient formatted message of the converted internal format message;

converting, by the message converter, the converted internal format message into the recipient formatted message associated with the recipient;

outputting, by the service provider system, the converted combined authorization and settlement message for communication to the recipient, wherein, the service provider system utilizes received or stored preferences or parameters to convert, process, and output the combined authorization and settlement message; and switching, by a network switch of the service provider system, the recipient formatted message from a network interface of the switch to a network interface of the recipient, based at least in part on a banking identification number (BIN) or a portion of an account number associated with the recipient.

2. The computer-implemented method of claim 1, wherein receiving a payment transaction message comprises receiving a payment transaction message from one of a merchant or an issuer.

3. The computer-implemented method of claim 1, wherein converting the transaction message to the internal format message is based at least in part on at least one preference of a merchant associated with the received payment transaction message.

4. The computer-implemented method of claim 1, further comprising one or more application services, wherein the one or more application services are selected from at least one of: routing, switching, settlement, reporting, value added services (VAS), fraud prevention, fraud detection, or chargeback/exception.

5. A system comprising:
at least one memory storing one or more computer-executable instructions operable to;
at least one processor operable to execute the one or more computer executable instructions to cause the at least one processor to:
receive a payment transaction message, wherein the payment transaction message comprises a combined authorization and settlement message, wherein the payment transaction message is a single protocol message one of a plurality of payment transaction messages parsed from a batch clearing file;

store the combined authorization and settlement transaction message in a database, wherein a recipient of the authorization and settlement message is identified based upon information included in the authorization and settlement message;

convert the payment transaction message into a converted internal format message, based on the settlement message being added to the batch clearing file, and wherein the converted internal format message is a dual protocol message corresponding to the payment transaction message;

process the converted internal format message, wherein the processed converted internal format message is further received and handled by one or more application services, wherein the one or more application services is based at least in part on a combination of (i) identifying errors in the combined authorization and settlement message, (ii) facilitating settlement and approval of the combined authorization and settlement message, (iii) facilitating chargebacks and exceptions associated with the combined authorization and settlement message, or (iv) facilitating reporting, billing, analytical, and fraud detection functions;

determine a recipient format of the converted internal format message based at least in part on one of preferences or parameters associated with a recipient of a recipient formatted message of the converted internal format message;

convert the converted internal format message into the recipient formatted message associated with the recipient; and switch the recipient formatted message from a network interface of a switch communicatively coupled to the at least one processor, to a network interface of the recipient, based at least in part on a banking identification number (BIN) or a portion of an account number associated with the recipient.

6. The system of claim 5, wherein the computer-executable instructions operable to cause the at least one processor to:
receive a payment transaction message, wherein the payment transaction message further comprises computer-executable instructions operable to cause the at least one processor to:
receive a payment transaction message from one of a merchant or an issuer.

7. The system of claim 5, wherein the computer-executable instructions operable to cause the switch to switch the recipient formatted message out the network interface of the switch to the network interface of the recipient is based at least in part on preferences or parameters associated with a merchant associated with the received payment message.

8. The system of claim 5, further comprising one or more application services, wherein the one or more application services are selected from at least one of: routing, switching, settlement, reporting, value added services (VAS), fraud prevention, fraud detection, or chargeback/exception.

9. A computer-implemented method comprising:
receiving, by a service provider system comprising one or more computers, a plurality of payment transaction messages, wherein the plurality of payment transaction messages are single protocol messages in a batch clearing file;

storing, in at least one database of the service provider system, the plurality of payment transaction messages;

translating, by the service provider system, each of the plurality of payment transaction messages to translated internal format messages;

determining, by a message converter in the service provider system, a recipient format expected by a recipient of the translated internal format messages, wherein the recipient format is based at least in part on one of preferences or parameters associated with the recipient of recipient formatted messages of the translated internal format messages;

translating, by the message converter, the translated internal format messages into the recipient formatted messages associated with the recipient, wherein the translated internal format messages are dual protocol messages, and the translation is based on the settlement message being added to the batch clearing file;

switching, by a switch of the service provider system, the recipient formatted messages from a network interface of the switch to a network interface of the recipient, based at least in part on a banking identification number (BIN) or a portion of an account number associated with the recipient; and outputting, by the service provider system, a combined authorization and settlement messages for communication to the recipient, wherein the service provider system utilizes received or stored preferences or parameters to translate, perform internal processing, and output the combined authorization and settlement messages.

10. The method of claim 9, wherein the one of preferences or parameters are used by the switch to determine a transaction network associated with the recipient device.

11. The computer-implemented method of claim 9, wherein converting the transaction message to the internal format message is based at least in part on at least one preference of a merchant associated with the received payment transaction message.

12. The computer-implemented method of claim 9, further comprising one or more application services, wherein the one or more application services are selected from at least one of: routing, switching, settlement, reporting, value added services (VAS), fraud prevention, fraud detection, or chargeback/exception.

13. A system comprising:
at least one memory storing computer-executable instructions; and
at least one processor operable to execute the one or more computer-executable instructions to cause the at least one processor to:

receive a plurality of payment transaction messages, wherein the plurality of payment transaction messages are single protocol messages in a batch clearing file;

store the plurality of payment transaction messages in a database;

translate each of the plurality of the payment transaction messages to internal format messages, wherein the internal format messages are dual protocol messages, and the translation is based on settlement messages being added to the batch clearing file;

determine by a message converter a recipient format expected by a recipient of translated internal format messages, wherein the recipient format is based at least in part on one of preferences or parameters associated with the recipient of recipient formatted messages of the translated internal format messages;

output a combined authorization and settlement messages for communication to the recipient, wherein, the service provider system utilizes received or stored preferences or parameters to translate, perform internal processing, and output the combined authorization and settlement messages; and switch the recipient formatted messages from a network interface, of a switch communicatively coupled to the at least one processor, to a network interface of the recipient, based at least in part on a banking identification number (BIN) or a portion of an account number associated with the recipient.

14. The system of claim 13, wherein the one of preferences or parameters are used by the switch to determine a transaction network associated with the recipient device.

15. The system of claim 13, wherein the computer-executable instructions operable to cause the switch to switch the recipient formatted message out the network interface of the switch to the network interface of the recipient is based at least in part on preferences or parameters associated with a merchant associated with the received payment message.

16. The system of claim 13, further comprising one or more application services, wherein the one or more application services are selected from at least one of the following: routing, switching, settlement, reporting, value added services (VAS), fraud prevention, fraud detection, or chargeback/exception.

* * * * *